United States Patent Office 2,991,838
Patented July 11, 1961

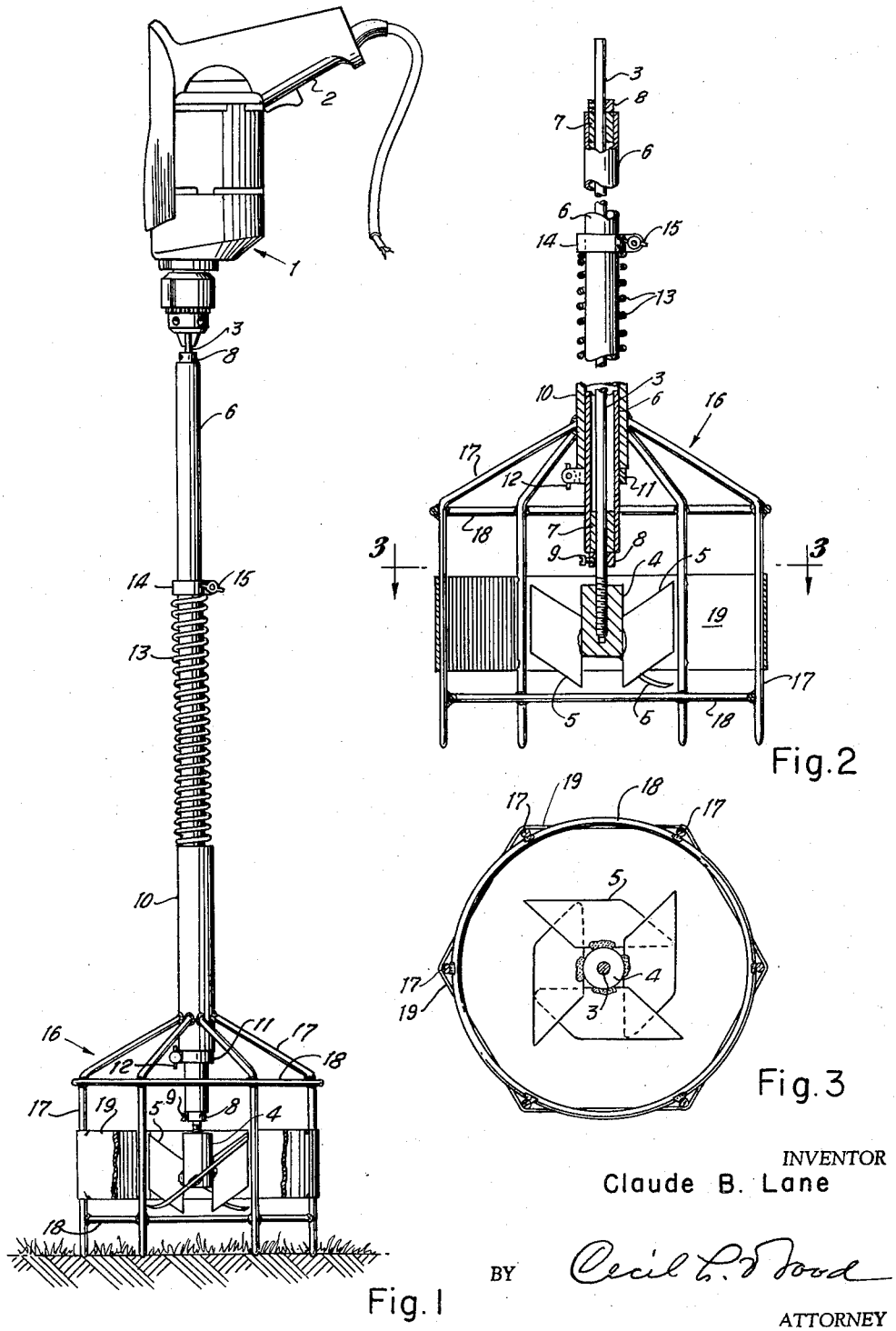

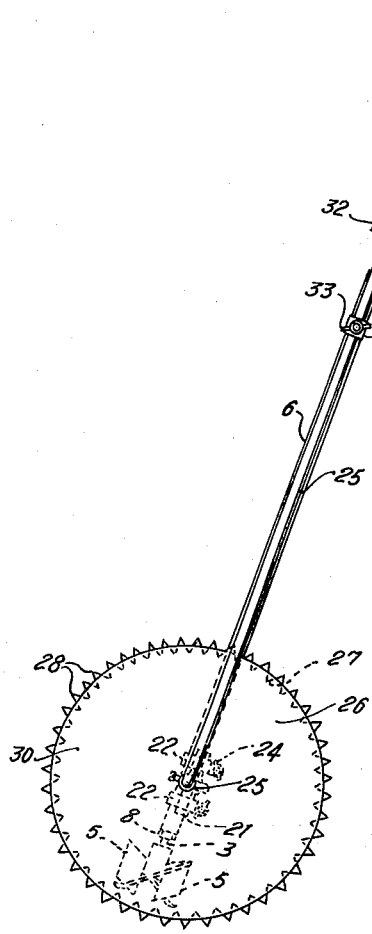

2,991,838
EARTH BORER, PULVERIZER, AND TRENCHING DEVICE
Claude B. Lane, 815 E. Morphy St., Fort Worth, Tex.
Filed July 16, 1959, Ser. No. 827,501
1 Claim. (Cl. 175—221)

This invention relates to an earth borer and pulverizer, adapted to be electrically operated, and it concerns more particularly an electrically driven hand tool for use in boring small holes in the earth, digging trenches therein, and pulverizing the soil, for agricultural and other purposes.

An object of the invention is to provide an electrically driven earth borer and pulverizer which is peculiarly adapted to be used for planting and cultivating shrubs, small trees, and other plants, and capable of being operated by a conventional electric drill having a chuck wherein the shank of the tool can be applied so that a light and simple mechanism is provided without a motor attached thereto which would obviously increase the weight and cost of the device.

Another object of the invention is to provide an electrically driven hand tool which is adapted to be used for digging small trenches in the soil surrounding buildings, preparatory to treating the soil for protection of the buildings against termites and the like.

Another object of the invention is to provide an electrically driven hand tool for the purposes described which is of simple, rugged construction, may be manufactured inexpensively, and is efficient in operation and durable in use.

The invention will be readily understood by referring to the following description and the accompanying drawing, in which:

FIGURE 1 is a side elevational view, partly broken away, of an electrically driven hand tool embodying the invention;

FIGURE 2 is a fragmentary elevational view on an enlarged scale, partly in section taken on a median line, of the tool shown in FIGURE 1;

FIGURE 3 is a sectional plan view taken on the line 3—3 of FIGURE 2;

FIGURE 4 is a side elevational view of another form of the invention;

FIGURE 5 is a side elevational view taken at right angles to the view shown in FIGURE 4; and FIGURE 6 is a fragmentary sectional view on lines 6—6 of FIGURE 5 showing the saddle member and clamps for attaching the tubular sleeve to the axle.

Referring to FIGURES 1 to 3 of the drawing, the device of the invention includes an electric motor, designated generally by the numeral 1, which is of a type commonly employed in electric drills, and has a hand grip 2. An elongated shaft 3 has one of its ends operatively connected to the motor 1, whereby the shaft 3 is adapted to be rotated about its axis by the action of the motor 1.

The end of the shaft 3 opposite the motor 1 is threaded, and a cylindrical element 4, which has an internally threaded socket therein adapted to receive the threaded end of the shaft 3, is removably connected thereto. A plurality of circumferentially spaced blades 5 are attached to the peripheral surface of the cylindrical element 4, and extend radially outwardly therefrom.

The blades 5 are substantially planar, and of quadrilateral shape, with parallel sides and ends, and are inclined relative to the longitudinal axis of the shaft 3. The shaft 3 is normally disposed vertically, and the blades 5 are inclined downwardly and forwardly relative to their direction of rotation. The leading lower edges of the blades 5 are cut away on the sides thereof nearest the shaft 3, whereby they are pointed, and are curved upwardly and forwardly relative to their direction of rotation.

An elongated sleeve 6, the length of which approaches the length of the shaft 3, surrounds the shaft 3 which is rotatable relative thereto. The sleeve 6 is positioned between the motor 1 and the cylindrical element 4, and extends substantially the entire distance between them. A pair of bushings 7 are disposed between the shaft 3 and the sleeve 6, adjacent opposite ends of the sleeve 6, and provide bearings for the shaft 3. A pair of collars 8, which surround the shaft 3 and are adjustably secured thereto by set screws 9, are positioned adjacent opposite ends of the sleeve 6.

A tubular member 10, which is comparatively short relative to the sleeve 6, surrounds the sleeve 6 and is positioned near its lower end. A split collar 11, which surrounds the sleeve 6, is positioned adjacent the lower end of the tubular member 10 and is secured in place by a bolt having a wing nut 12. A compression spring 13 surrounds the sleeve 6 and is positioned above the tubular member 10. A split collar 14, which surrounds the sleeve 6, is positioned adjacent the upper end of the spring 13 and is secured in place by a bolt having a wing nut 15.

A circular cage 16, as hereinafter described, surrounds the lower end of the tubular member 10 and extends radially outwardly and downwardly therefrom, around the cylindrical element 4 and the blades 5, for engagement with the ground. The cage 16 consists of a plurality of circumferentially spaced, longitudinally extending rods 17, which are sharpened at their lower ends for engagement with the ground and are bent radially inwardly and connected at their upper ends to the tubular member 10, a pair of rings 18 which are connected to the rods 17 in spaced apart relation to each other, and a polygonal band 19 which is wrapped about the rods 17 and is disposed between the rings 18.

In operation, the cage 16 provides a protective guard surrounding the blades 5, and also prevents rotative or lateral displacement of the tool relative to the ground by engagement of the lower ends of the rods 17 with the ground. The blades 5 may be advanced relative to the ground, whereby the depth of cut is determined, by downward movement of the sleeve 6 against the resistance of the spring 13.

In the modified form of the invention, illustrated in FIGURES 4, 5 and 6, the member 10 and the spring 13 are removed from the sleeve 6 by disengaging the collars 11 and 14 and the sleeve 6 is attached near its lower end to an axle 20 which has a saddle member 21 fixed thereto, as shown particularly in FIGURE 6, and is transverse to the axis of the axle 20. The saddle member 21 is semi-circular in transverse section and conformably receives the sleeve 6 whereby the latter can be rigidly attached to the axle 20 by clamps 22 embracing the saddle member 21 and the sleeve 6 in the manner shown in FIGURE 6. The clamps 22 are removably secured by bolts 23 having wing nuts 24 thereon.

Journalled on each end of the shaft 20, and retained by removable collars 25, are a pair of disks 26 and 27, the latter having serrations 28 formed peripherally thereof to provide for better traction and prevent rotation of the sleeve 6 when the device is operated in forming a trench when the rotary blades 5 are moved along the ground.

A handle 29 is provided which is formed with the axle 20 and is bent at right angles with the latter, as shown in FIGURE 5, and has a portion 30 extending upwardly and parallel to the sleeve 6 and inclined inwardly toward the sleeve 6 and has a portion 31 which lies parallel and adjacent thereto toward its upper end where a right-angular hand grip 32 is formed. The portion 31 of the handle 29 is removably attached to the sleeve 6 by a collar 33 secured by a bolt having a wing nut 34 thereon.

In operating the rotary blades 5 through the shaft 3 the upper end of the latter is received by the conventional chuck 35 of the hand drill 1, in the manner shown in FIGURES 1, 4 and 5.

The invention is capable of certain changes and modifications, by persons skilled in the art, without departing from the spirit of the invention or the scope of the appended claim.

What is claimed is:

A manually operable, electrically driven earth boring tool comprising, in combination with a portable electric drill, a vertically disposed elongated shaft having its upper end operatively connected to the drill whereby the shaft is adapted to be rotated by the drill, a rotary cutting element connected to the lower end of the shaft, a tubular guide and support for the shaft consisting of an elongated first sleeve surrounding the shaft and arranged concentrically relative thereto, the sleeve having a length approaching the lengths of the shaft and the shaft extending above and below the ends of the sleeve, means securing the shaft against longitudinal movement relative to the sleeve and bearing means whereby the shaft is journaled in the sleeve, and means yieldably supporting the first sleeve relative to the ground consisting of a second sleeve, substantially shorter than the first sleeve, surrounding the first sleeve and slidable longitudinally relative thereto, a coil spring surrounding the first sleeve and having its lower end in abutting engagement with the second sleeve, a spring seat carried by the first sleeve engaging the upper end of the spring, the spring acting on the second sleeve and the spring seat to resist downward movement of the first sleeve relative to the second sleeve, mutually engaging means carried by the first and second sleeves limiting upward movement of the first sleeve relative to the second sleeve, and ground engaging means connected to the second sleeve straddling the cutting element and extending below it in the uppermost position of the first sleeve relative to the second sleeve.

References Cited in the file of this patent

UNITED STATES PATENTS

| 853,010 | Gray | May 17, 1907 |
| 1,249,070 | Greene | Dec. 4, 1917 |
| 2,562,276 | Kandle | July 31, 1951 |
| 2,779,259 | Kelsey | Jan. 29, 1957 |